US006957274B2

(12) United States Patent
Trace et al.

(10) Patent No.: US 6,957,274 B2
(45) Date of Patent: Oct. 18, 2005

(54) SYSTEM ADDS ADDITIONAL NEW ROUTES AND DEFAULT ROUTES TO A ROUTING TABLE TO ALLOW CONCURRENT ACCESS TO TWO DIFFERENT NETWORK CONNECTIONS

(75) Inventors: Rob M. Trace, Redmond, WA (US); Donald H. Rule, Mercer Island, WA (US); Nicholas P. Ball, Olympia, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 09/681,922

(22) Filed: Jun. 27, 2001

(65) Prior Publication Data

US 2003/0046397 A1 Mar. 6, 2003

(51) Int. Cl.[7] .............................................. G06F 15/173
(52) U.S. Cl. ........................ 709/242; 709/240; 370/351
(58) Field of Search ................................. 709/238, 239, 709/242, 230, 245, 244, 240; 370/389, 395.52, 395.31, 401, 351; 707/10

(56) References Cited

U.S. PATENT DOCUMENTS

| 5,241,682 A | 8/1993 | Bryant et al. |
| 5,568,471 A | 10/1996 | Hershey et al. |
| 5,916,302 A | 6/1999 | Dunn et al. |
| 6,064,671 A | * 5/2000 | Killian ........................ 370/389 |
| 6,119,170 A | * 9/2000 | Schoffelman et al. ....... 709/244 |
| 6,385,615 B1 | * 5/2002 | Haeri et al. ................... 707/10 |
| 6,529,517 B2 | * 3/2003 | Hrastar et al. .............. 370/401 |
| 6,621,820 B1 | * 9/2003 | Williams et al. ........ 370/395.31 |
| 6,625,658 B1 | * 9/2003 | Oguchi et al. .............. 709/238 |
| 6,636,516 B1 | * 10/2003 | Yamano ................. 370/395.52 |
| 6,643,706 B1 | * 11/2003 | Marques et al. ............ 709/242 |
| 2001/0049739 A1 | * 12/2001 | Wakayama et al. ......... 709/230 |
| 2002/0069292 A1 | * 6/2002 | Gaddis et al. .............. 709/238 |
| 2002/0112076 A1 | * 8/2002 | Rueda et al. ................ 709/245 |

* cited by examiner

*Primary Examiner*—Le Hien Luu
(74) *Attorney, Agent, or Firm*—Microsoft Corporation (57) ABSTRACT

Concurrent access to a first networking connection, such as an Internet connection, and a second networking connection, such as a virtual private networking (VPN) connection, is disclosed. The first connection is established, adding first default routes to a routing table. The first routes are associated with the first connection and have priority. The second connection is established, adding second default routes to the routing table. The second routes are associated with the second connection, and have priority over the first routes. Specific routes associated with the second connection are added from a preset routing file to the routing table. The second routes are removed, regaining priority for the first routes. Data packets intended for the second connection are routed according to the specific routes added to the routing table from the preset table. Other data packets are routed to the first connection according to the first routes.

16 Claims, 9 Drawing Sheets

SYSTEM ADDS ADDITIONAL NEW ROUTES AND DEFAULT ROUTES TO A ROUTING TABLE TO ALLOW CONCURRENT ACCESS TO TWO DIFFERENT NETWORK CONNECTIONS

BACKGROUND OF INVENTION

This invention relates generally to second networking connections, such as virtual private networking (VPN) connections, established in addition to first networking connections, such as Internet connections. More particularly, this invention relates to concurrent access to both first and second networking connections.

Many corporate computer users today establish two networking connections when they are away from the office, such as at home, or when traveling. First, they have an Internet networking connection, which allows them to access the Internet for activities such as web browsing. Second, they have a corporate networking connection, which allows them to access the private network of their corporation for activities such as retrieving corporate email and intranet browsing. The Internet connection is usually insecure, which means that, with the proper technology, interlopers can relatively easily monitor and decipher the users' Internet traffic.

Conversely, the corporate networking connection, which may be what is known as a virtual private networking (VPN) connection, is usually secure, which means that interlopers cannot usually decipher the users' corporate network traffic. The corporate networking connection may be made by a direct dial-up connection to the corporate network, sometimes referred to as a remote access server (RAS) connection, or by a secure connection through the Internet connection. The latter approach is often referred to as tunneling. Two common tunneling standards are the point-to-point tunneling protocol (PPTP), and (IPSEC).

A disadvantage to establishing a corporate networking connection in addition to an Internet connection is that the former connection frequently prevents using the latter connection. For example, a user may have a persistent, or always-on, Internet connection at home through digital subscriber line (DSL) or cable modem technology. With the Internet connection, the user has access to Internet email, and can browse the web. The user may then establish a corporate networking connection either by a direct dial-up connection, or by tunneling through the Internet connection. However, once the corporate networking connection is established, the user may subsequently lose the ability to access Internet email, or browse the web. Although the Internet connection is still there, the user cannot access it in a useful manner.

This either-or situation lessens the convenience of establishing corporate networking connections at home for corporate users. The users typically will establish their corporate networking connections only briefly before disconnecting, so that they can continue to use their Internet connections for Internet email and web browsing. Because establishing and subsequently terminating a corporate networking connection may be somewhat of a hassle for the average corporate user, the user may access the corporate network from home less often than is desirable. As an example, a user may only check corporate email two or three times a day from home, and therefore not receive important messages as timely as he or she would if the corporate networking connection were persistent.

For the reasons described here, as well as for other reasons, there is a need for the present invention.

SUMMARY OF INVENTION

The invention relates to concurrent access to both a first networking connection, such as an Internet connection, and a second networking connection, such as a corporate networking connection. The first networking connection is initially established. This causes one or more first default routes to be added to a routing table. The routing table contains the current network topology. The table provides network hardware with the directions needed to forward packets of data to locations on other networks. The first default routes are associated with the first networking connection, and have priority within the routing table. This means that data packets that do not have a destination identified by a specific route within the routing table are routed accorded to the first default routes.

The second networking connection is then established. This causes one or more second default routes to be added to the routing table. The second default routes are associated with the second networking connection, and have priority over the first default routes within the routing table. This means that data packets that do not have a destination identified by a specific route within the routing table are routed according to the second default routes, and not the first default routes. For example, data packets that would otherwise be routed to the Internet through the first networking connection are now routed to the corporate network through the second networking connection.

A preset routing file having one or more routes associated with the second networking connection is then accessed, so that one or more specific routes associated with the second networking connection are added from the preset routing file to the routing table. More specifically, the preset routing file includes a list of subnets that are available on the network accessible by the second networking connection. That is, the preset routing file describes the routes that are available through the second networking connection. The second default routes associated with the second networking connection are then removed, causing the first default routes to regain priority within the routing table. The result is that data packets, for example, intended for the corporate network are routed according to the specific routes added to the routing table from the preset routing file, such that they successfully reach their destination. Data packets intended for the Internet are routed according to the first default routes that regained priority within the routing table, such that they successfully their destination, too.

The invention, in other words, provides for what is commonly but somewhat inaccurately referred to as split tunneling so that both a first networking connection and a second networking connection are concurrently accessible. A corporate user working at home may access the Internet, for example, even when he or she is connected to a corporate network. The specific routes added to the routing table from the preset routing file ensure that data packets intended for the latter are correctly routed. The first default routes within the routing table ensure that data packets intended for the former are also correctly routed. Besides those described here, other aspects, advantages, and embodiments of the invention will become apparent by reading the detailed description, and referring to the accompanying drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Networking Background and the Network Inaccessibility Problem

Figure 1:
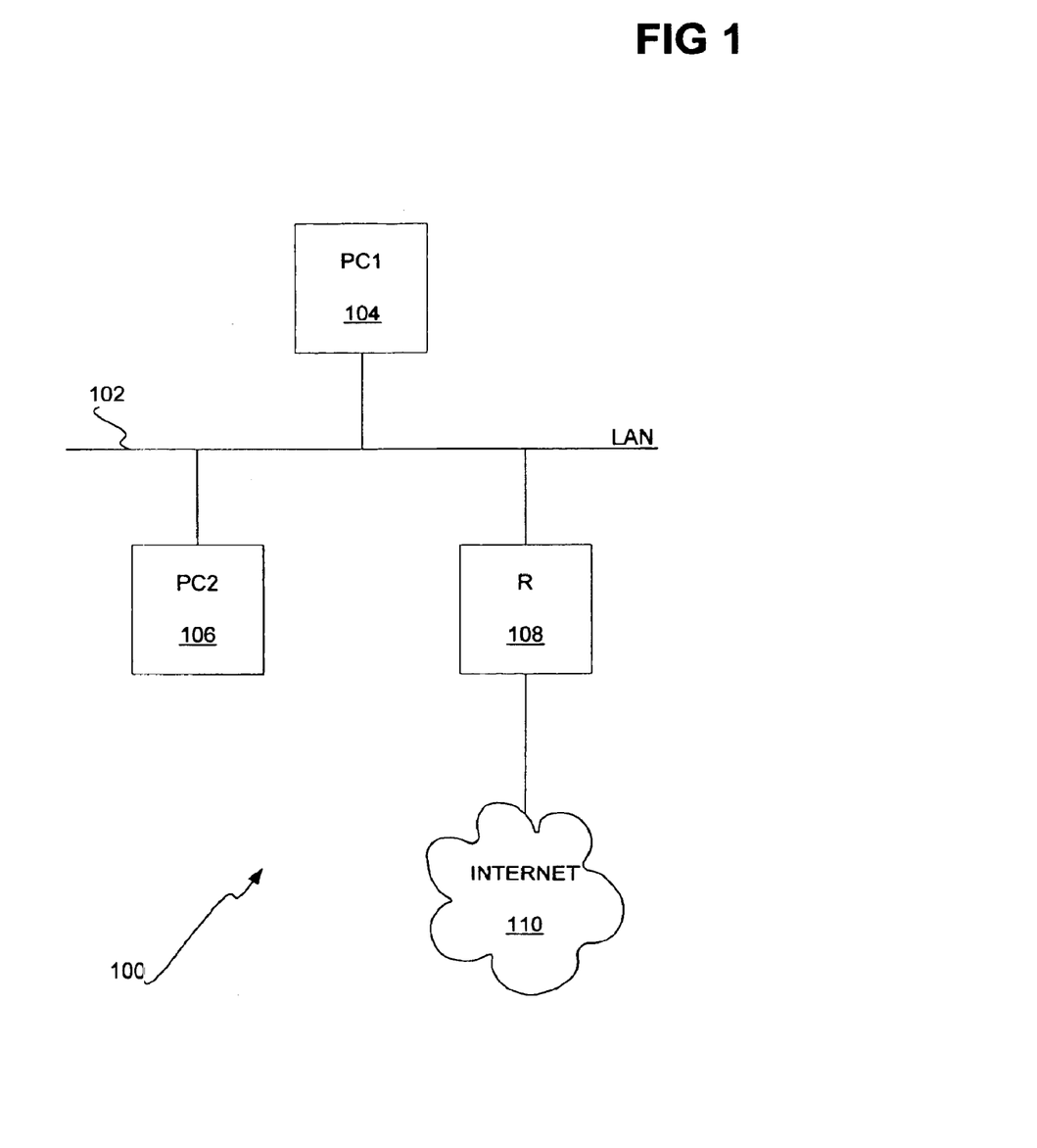
FIG. 1 is a diagram showing an example networking environment in which the invention can be implemented.

FIG. 1 shows a diagram 100 of part of an example networking environment in conjunction with which the invention may be implemented. The network 102 has three devices connected to it: a first client 104, a second client 106, and a router 108. Each of the first client 104 and the second client 106 may be, for example, a personal computer. Because both the first client 104 and the second client 106 are directly connected to the network 102, they may communicate with each other. This means that they may send packets of data to one another, in accordance with a predetermined protocol. This protocol may be the Transmission Control Protocol/Internet Protocol (TCP/IP), for instance.

The router 108 permits devices on the network 102 to communicate with devices not directly connected to the network 102. For instance, the router 102 permits the first client 104 and the second client 106 to communicate with devices connected to the Internet 110. More specifically, the router 108 receives packets of data transmitted by the first client 104 and the second client 106, and forwards them to their destination. Other network topologies, besides that of the diagram 100, are also amenable to the invention. For example, in the context of a home Internet connection, a personal computer may have a modem that effectively connects the computer to the Internet. The modem may be a digital subscriber loop (DSL) modem, a cable modem, a dial-up analog modem, or another type of device.

A data packet sent by a device on the network 102 to another device has three parts: a from address field, a to address field, and a data field. The from address field specifies the address of the device sending the packet, whereas the to address field specifies the address of the intended recipient. The data field is the actual data to be sent. The addresses in the from and to address fields may be Internet Protocol (IP) addresses. These addresses are referred to as IP addresses.

All IP networking addresses are divided into two portions: the network address, and the host address. The network portion of the IP networking address defines the level at which routing is done. This means that all devices with the same network address are on the same network. For example, for an IP networking address a.b.c.d, the network portion of that address may be a.b, and the host portion of that address may be c.d. In this case, all devices with the IP address a.b.*.* would be on the same network, such as on the network 102.

By default, Internet IP addresses are divided into three-to-five classes. Each of these ranges has a different portion of the IP address reserved as the network and host addresses. The classes are shown in Table 1.

TABLE 1

| Class | IP Range | Network Host |
|---|---|---|
| Class A | 1.*.*.* to 127.*.*.* | a b.c.d |
| Class B | 128.*.*.* to 191.*.*.* | a.b c.d |
| Class C | 192.*.*.* to 223.*.*.* | a.b.c d |
| Multicast: Class D | 224.0.0.0 to 239.255.255.255 | |
| Reserved: Class E | 240.0.0.0 to 247.255.255.255 | |

Netmasks are a shorthand way to define what portion of an IP address is reserved for the network address. The netmask is a set of 1 and 0 bits. Bits set to 1 define the network portion of an IP address, whereas bits set to 0 define the host portion of an IP address. For example, in the Class B address a.b.c.d, the network portion is a.b and the host portion is c.d. This is equivalent to the netmask 255.255.0.0, where 255.255.0.0 is written in binary as 11111111.11111111.00000000.00000000. The three classes of networks A, B, and C, have the default netmasks shown in Table 2.

TABLE 2

| Class | IP Range | Netmask | Uniquely addressable devices on the network |
|---|---|---|---|
| Class A | 1.*.*.* to 127.*.*.* | 255.0.0.0 | 16,777,215 |
| Class B | 128.*.*.* to 191.*.*.* | 255.255.0.0 | 65,535 |
| Class C | 192.*.*.* to 223.*.*.* | 255.255.255.0 | 255 |

Thus, packets sent to 100.1.2.3 are routed at the level 100.0.0.0, and all sixteen million devices in the 100.*.*.* range should form one distinct network. Packets sent to 200.1.2.3 are routed at the level 200.1.2.0, and all 255 machines in the 200.1.2.* range should form one distinct network. Often, the default netmasks are not sufficient. A network can be further defined with a custom netmask, called a subnet, by a process referred to as subnetting. A custom netmask changes the definition of the network size, and changes the level at which routing is done.

A routing table contains the current networking topology. The table provides network hardware with the directions needed to forward packets of data to locations on other networks. Each of the first client 104 and the second client 106 typically has a local routing table. For example, the first client 104 may have the routing table shown in Table 3.

TABLE 3

| Line | Active Routes: Network Destination | Netmask | Gateway | Interface | Metric |
|---|---|---|---|---|---|
| 1 | | | | | |
| 2 | | | | | |
| 3 | 0.0.0.0 | 0.0.0.0 | 192.168.0.168 | 192.168.0.6 | 1 |
| 4 | 127.0.0.0 | 255.0.0.0 | 127.0.0.1 | 127.0.0.1 | 1 |
| 5 | 192.168.0.0 | 255.255.255.0 | 192.168.0.6 | 192.168.0.6 | 1 |
| 6 | 192.168.0.6 | 255.255.255.255 | 127.0.0.1 | 127.0.0.1 | 1 |
| 7 | 192.168.0.255 | 255.255.255.255 | 192.168.0.6 | 192.168.0.6 | 1 |
| 8 | 224.0.0.0 | 224.0.0.0 | 192.168.0.6 | 192.168.0.6 | 1 |
| 9 | 255.255.255.255 | 255.255.255.255 | 192.168.0.6 | 192.168.0.6 | 1 |
| 10 | Default Gateway: | 192.168.0.168 | | | |

Lines 3–9 indicate the active routes in the routing table. For a given destination address, the address is logically and'ed with the netmask of each route. If the result is the specified network destination of that route, then the packet of data may be sent to the gateway specified by the route, through the interface specified by the route. The metric of a route specifies its priority relative to other routes, where the lower the metric, the higher the priority of the route. If more than one route of different priority matches the destination address, the data packet is sent to the higher priority route.

Furthermore, if more than one route of the same priority matches the destination address, the data packet is sent according to the most specific route. Route specificity is determined by the netmask, where the less addresses covered by the netmask, the greater the specificity of the route. For example, the netmask 255.255.255.0 covers 255 addresses, the netmask 255.255.0.0 covers 65,535 addresses, and so on. In the routing table of Table 3, lines 6, 7, and 9 specify routes covering only a single address. Line 5 specifies a route that covers 255 addresses, whereas line 4 specifies a route that covers more than sixteen million addresses. The greatest number of addresses is covered by the routes specified by line 3.

Line 10 of the routing table of Table 3 specifies the default gateway. Data packets that do not match any of the specific routes of the routing table are sent to the default gateway for transmission to their correct destination. In practical effect, line 3 is a route that specifies the default gateway, since the netmask of this route covers all possible addresses. The default gateway is the address of the router 108 of FIG. 1. A data packet sent by the first client 104 that is not directed to another device on the network 102 would thus be directed to the default gateway. Furthermore, the route of line 5 is for data packets sent to other devices on the network 102, such as the second client 106. The routes of lines 4 and 6 specify the address of the first client 104 itself. The routes of lines 7, 8, and 9 specify still other routes.

Figure 2:
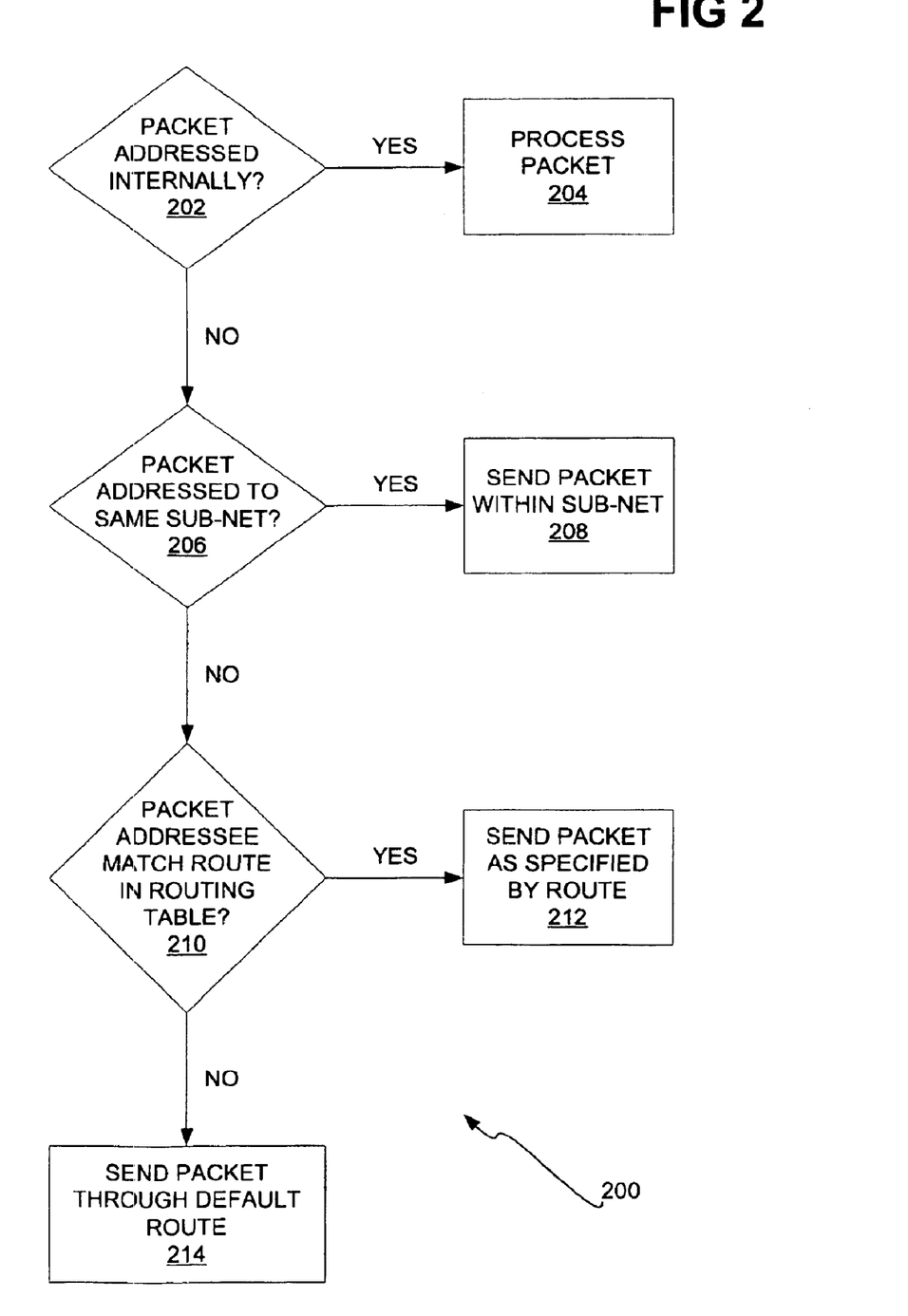
FIG. 2 is a flowchart of a method showing the usual approach for packet delivery specified by a routing table.

In practical effect, a routing table, such as that of Table 3, typically achieves the data packet delivery of the method 200 of FIG. 2. If a packet is addressed internally (202), which is a packet addressed to the sender of the packet, it is sent back to the sender, where the packet is processed (204). Otherwise, if the packet is addressed to the same subnet (206), which is a packet addressed to a device on the same network as the sender, it is sent within the subnet (208). If this is not the case, but if the destination address of the packet otherwise matches a route in the routing table (210), then the packet is sent as specified by that route (212). Finally, the default case is where the packet is sent through the default route (214).

Therefore, packets sent by the first client 104 of FIG. 1 can have at least three potential destinations. First, a packet may be intended for the first client 104 itself. It is routed back to the client as specified by the route of line 4 or 6 of Table 3, and as summarized by 202 and 204 of FIG. 2. Second, a packet may be intended for another device on the network 102, such as the second client 106. The packet is routed according to the route of line 5 of Table 3, and as summarized by 206 and 208 of FIG. 2. Third, assuming that the packet is not covered by another route of the routing table of Table 3, such that 210 and 212 of FIG. 2 do not apply, the packet is directed to the default gateway, which is the router 108. That is, the packet is routed according to the route of line 3 of Table 3, as summarized by 214 of FIG. 2.

The first client 104 can be said to have a connection to the Internet 110 through the network 102 and the router 108. This Internet connection is a first connection of the first client 104. The first client 104 may then establish a second connection, such as a secure connection to a corporate network. This secure connection may be a virtual private network (VPN) connection. The second connection may be established, for example, either by a dial-up modem connection, or over the Internet itself via tunneling. The former is shown in the diagram 300 of FIG. 3, in which the first client 104 has established a dial-up connection 302 to a corporate network 304. The latter is shown in the diagram 400 of FIG. 4, in which the first client 104 has established a point-to-point tunneling protocol (PPTP) connection through the Internet 110 to the corporate network 304.

Figure 3:
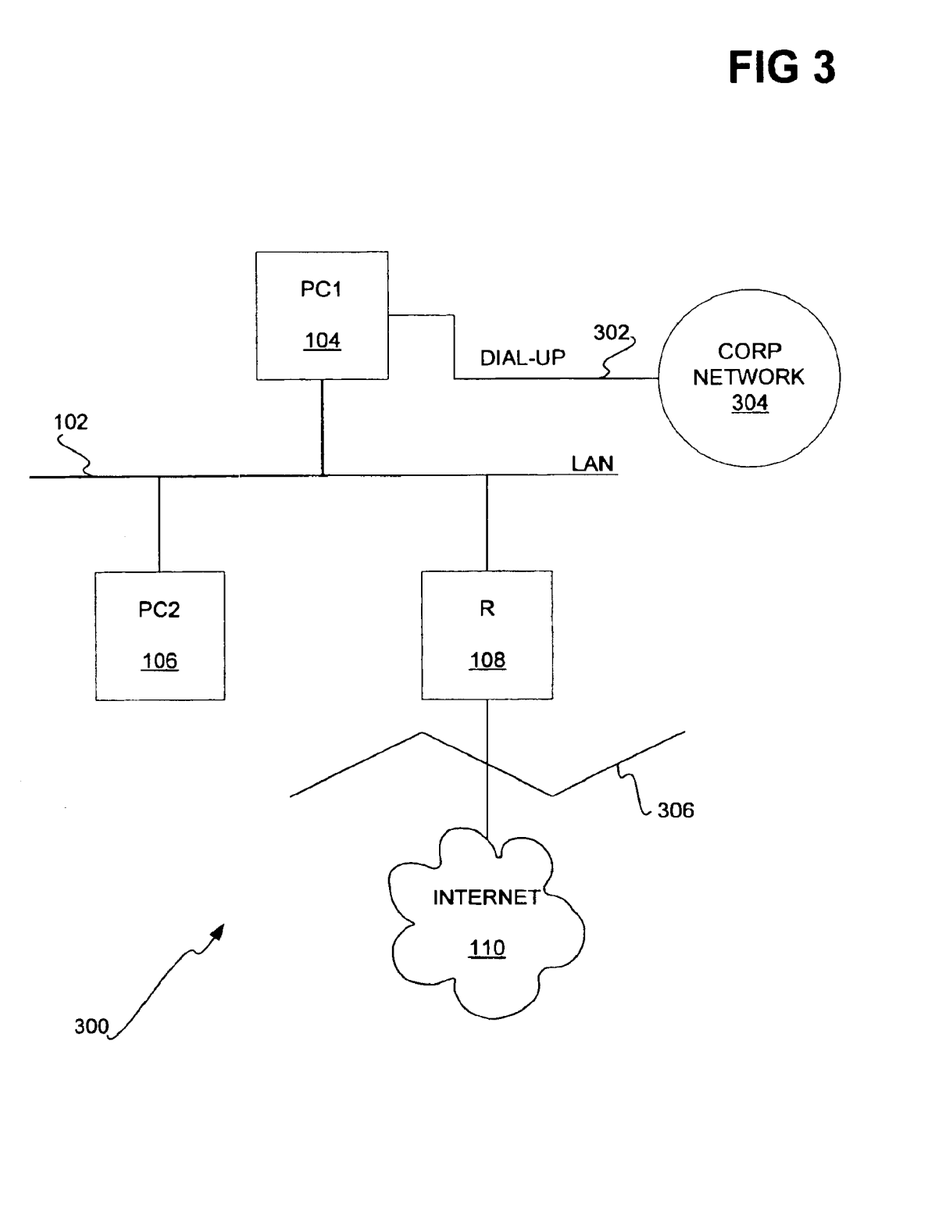
FIG. 3 is a diagram showing a dial-up modem connection to a corporate network within the environment of FIG. 1, such that the Internet connection is no longer accessible.
Figure 4:
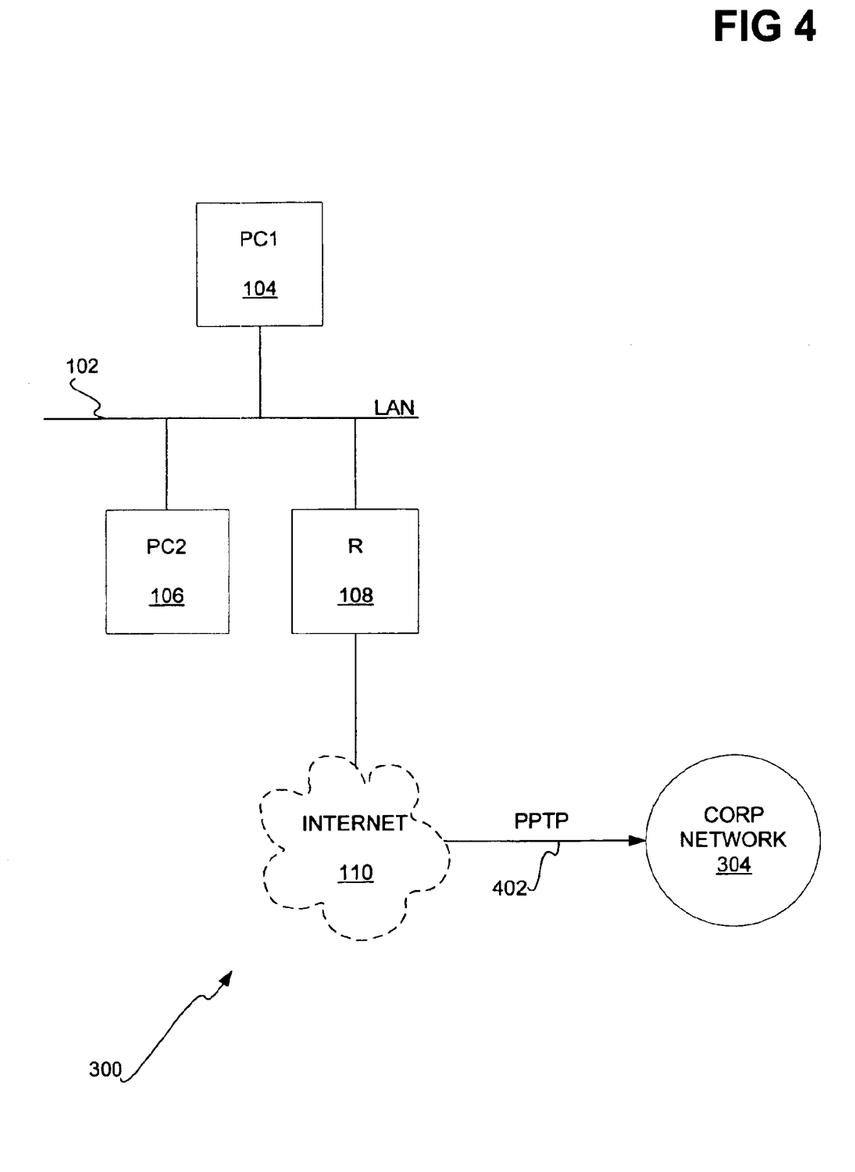
FIG. 4 is a diagram showing a tunneling connection to a corporate network within the environment of FIG. 1, such that the Internet connection is no longer accessible.

The establishment of this second connection causes the routing table of the first client change. For example, the routing table of Table 3 may be modified to the routing table sho Table 4.

TABLE 4

| Line | Active Routes: Network Destination | Netmask | Gateway | Interface |
|---|---|---|---|---|
| 1 | | | | |
| 2 | | | | |
| 3 | 0.0.0.0 | 0.0.0.0 | 192.168.0.168 | 192.168.0.6 |

TABLE 4-continued

| Line | Active Routes: Network Destination | Netmask | Gateway | Interface |
|---|---|---|---|---|
| 4 | 0.0.0.0 | 0.0.0.0 | 204.231.221.109 | 204.231.221.10 |
| 5 | 127.0.0.0 | 255.0.0.0 | 127.0.0.1 | 127.0.0.1 |
| 6 | 192.168.0.0 | 255.255.255.0 | 192.168.0.6 | 192.168.0.6 |
| 7 | 192.168.0.6 | 255.255.255.255 | 127.0.0.1 | 127.0.0.1 |
| 8 | 192.168.0.255 | 255.255.255.255 | 192.168.0.6 | 192.168.0.6 |
| 9 | 224.0.0.0 | 224.0.0.0 | 192.168.0.6 | 192.168.0.6 |
| 10 | 224.0.0.0 | 224.0.0.0 | 204.231.221.109 | 204.231.221.10 |
| 11 | 255.255.255.255 | 255.255.255.255 | 192.168.0.6 | 192.168.0.6 |
| 12 | Default Gateway: | 204.231.221.109 | | |

Significantly, the default gateway has changed from the routing table of Table 3 to the routing table of Table 4, as indicated in line 12 of Table 4. Furthermore, the route specified by line 3 of Table 3 that is associated with the old default gateway has had its metric increased by one, as shown in line 3 of Table 4. The new default gateway has its route specified by line 4 of Table 4, and has a metric of one. The new default gateway therefore has a higher priority than the old default gateway in the routing table of Table 4.

The effect of the old default gateway having a lower priority than the new default gateway in the routing table of Table 4, after the establishment of the second connection, is that network destinations serviced by the router associated with the old default gateway are no longer accessible. For example, in FIG. 3, the old default gateway is the router 108, which services network destinations on the Internet 110. When the first client 104 has established the dial-up connection 302 to the corporate network 304, resulting in the routing table of Table 4, the first client 104 cannot communicate with nodes on the Internet 110 through the router 108. This is indicated in FIG. 3 by the line 306. Similarly, in FIG. 4, the old default gateway is the router 108, which services network destinations on the Internet 110. When the first client 104 has established the PPTP connection 402 to the corporate network 304, resulting in the routing table of Table 4, the first client 104 cannot communicate with other nodes on the Internet 110 through the router 108. This is indicated in FIG. 4 by the dotted lines of the Internet 110.

Retaining Accessibility to the First Network Connection

The invention allows for retaining accessibility through a first network connection, such as an Internet connection or another insecure connection, when establishing a second network connection, such as a secure connection to a corporate network. The invention accomplishes this by modifying the routing table, either after the second connection is made, or before the second connection is made. The former approach is illustrated in the method 500 of FIG. 5, whereas the latter approach is illustrated in the method 600 of FIG. 6. Either method is performed by a given client, such as the first client 104 of FIGS. 1, 3, and 4.

Figure 5:
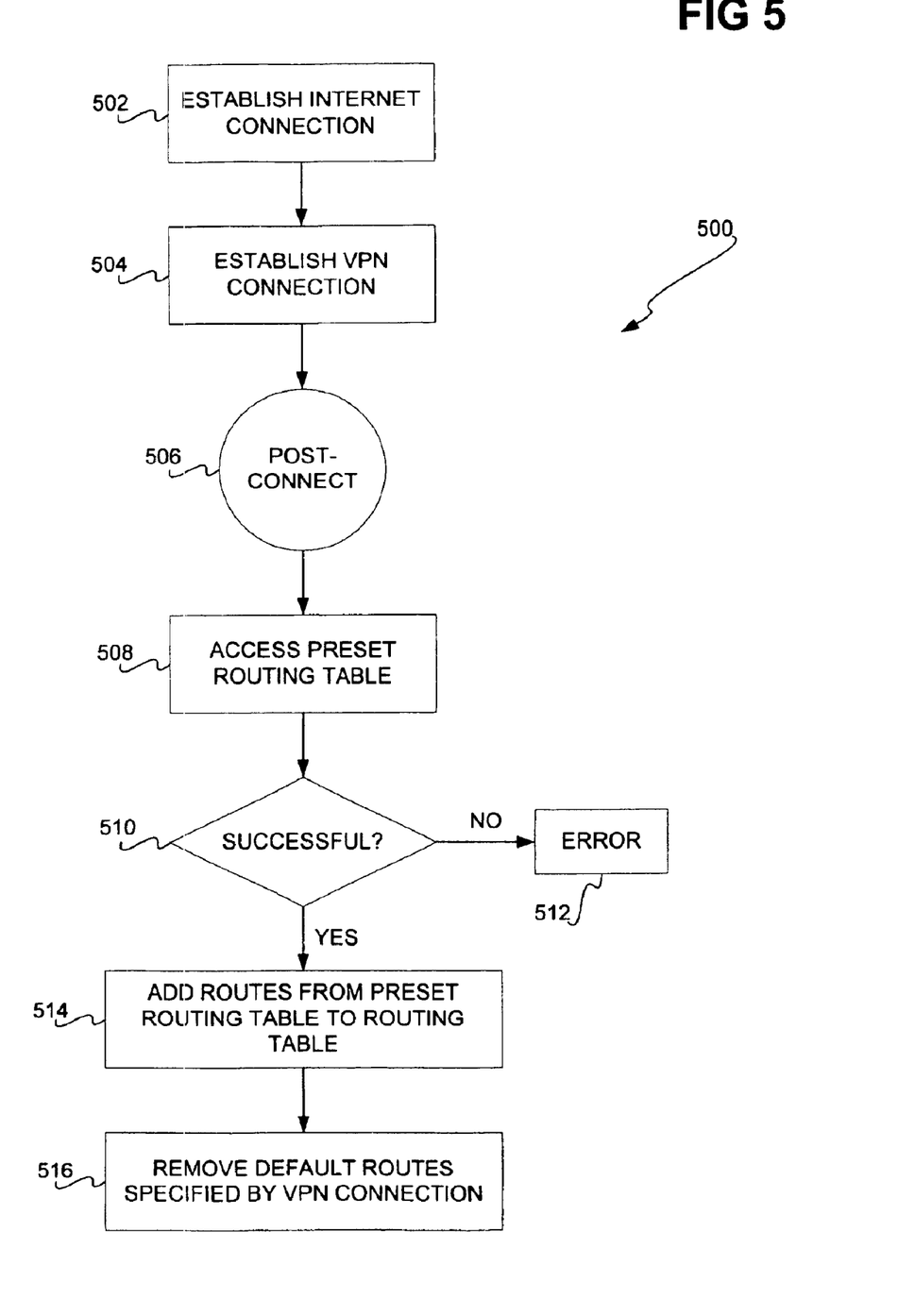
FIG. 5 is a flowchart of a method showing how one embodiment achieves concurrent access to both a first networking connection and a second networking connection.

In the method 500 of FIG. 5, a first connection, such as an Internet connection, is initially established (502). This can result in the network topology of FIG. 1, previously described. After the first connection is made, the local routing table has a default gateway, such as the address associated with the router 108. An example of a routing table after the first connection has been made is that of Table 3, which has already been described. Line 3 of Table 3 specifies a default route that is associated with the default gateway. It has priority within the routing table of Table 3 in that if no other route in the routing table is applicable to a given data packet, then the default route governs routing of the data packet.

A second connection, such as a virtual private network (VPN) connection, is then established (504). This can result in the network topology of FIG. 3, in the case of a dial-up connection, or FIG. 4, in the case of a tunneling connection. After the second connection is made, the local routing table has a new default gateway. The old default gateway is no longer active, such that accessibility to nodes only accessible through the old default gateway is no longer possible. This means, for example, that Internet connectivity resulting from the first connection is effectively lost. An example of a routing table after the second connection has been made is that of Table 4, which has already been described. Line 4 of Table 4 specifies a default route that is associated with the new default gateway. It has priority within the routing table of Table 4 over the default route associated with the old default gateway, indicated by line 3 of Table 4. That is, the metric of the new default route is lower than the metric of the old default route. This occurs because the metric of the old default route is increased by one from the routing table of Table 3 to that of Table 4.

The establishing of the second connection results in a connection event. The indication of the connection event causes one or more post-connection event actions (506) to occur. In particular, a preset routing file that has one or more routes associated with the second networking connection is accessed (508). More specifically, the preset routing file includes a list of subnets that are available on the network accessible by the second networking connection. That is, the preset routing file describes the routes that are available through the second networking connection.

The preset routing file is different than the routing table of the client, and can be accessed from one of at least two places. First, the preset routing file may be stored locally as a file at the client performing the method 500. For example, the network administrator may have distributed the file electronically or on a floppy disk or CD-ROM for the end users to install on their individual clients. The file may be part of a connection management computer program that when run on the client causes the file to be stored locally at the client. Second, the preset routing file may be stored remotely at a server accessible through the second networking connection. For example, where the second connection provides access to a corporate network, the preset routing file may be accessible at a server within the corporate network at a given networking access. Third, the preset routing file may be accessed through a directory service.

Accessing the preset routing file may be successful or unsuccessful (510). For example, failure may result from the preset routing file not being found. It may have been deleted or renamed if stored at the client, for instance, or may no longer be on the remote server where the client expects to find it. If unsuccessful, then the method 500 is aborted (512). Abortion of the method 500 means that the user does not have concurrent access through the first networking connection and the second networking connection. For example, as has been described in relation to FIGS. 3 and 4, nodes accessible only through the Internet connection will not be accessible after the second networking connection has been made. This is indicated in FIG. 3 by the line 306, and in FIG. 4 by the dotted line nature of the Internet 110. However, the second networking connection is still accessible.

Preset routing file access success, however, causes routes to be added from the preset to the local routing table of the client (514). The routes of the preset routing file that are ad associated with the second networking connection. They do not specify default gateway rou rather are specific routes meant to route traffic intended for the corporate network 304 of F 4, for example, without the need for a default gateway. The routing table of Table 5 shows table of Table 4 after the specific routes associated with the second networking connection added.

Removal of the new default gateway of the route of line 4 of Table 5 may be accomplished by decrementing its metric to zero, which indicates that the route should be removed.

The effect of the addition of the routes from the preset routing file in 514, and the removal of the default routes associated with the new default gateway in 516, is that both the first networking connection and the second networking connection are concurrently accessible through the routing table. For example, data packets intended for delivery over the Internet are again routed according to the route associated with the old default gateway of line 3 of Table 6. Data packets intended for delivery to the corporate network are still routed correctly due to the addition of the routes associated with the second networking connection of lines 9–11 of Table 6 from the preset routing file. Thus, the

TABLE 5

| Line | Active Routes: Network Destination | Netmask | Gateway | Interface |
|---|---|---|---|---|
| 1 | | | | |
| 2 | | | | |
| 3 | 0.0.0.0 | 0.0.0.0 | 192.168.0.168 | 192.168.0.6 |
| 4 | 0.0.0.0 | 0.0.0.0 | 204.231.221.109 | 204.231.221.10 |
| 5 | 127.0.0.0 | 255.0.0.0 | 127.0.0.1 | 127.0.0.1 |
| 6 | 192.168.0.0 | 255.255.255.0 | 192.168.0.6 | 192.168.0.6 |
| 7 | 192.168.0.6 | 255.255.255.255 | 127.0.0.1 | 127.0.0.1 |
| 8 | 192.168.0.255 | 255.255.255.255 | 192.168.0.6 | 192.168.0.6 |
| 9 | 204.231.221.76 | 255.255.255.255 | 204.231.221.109 | 204.231.221.10 |
| 10 | 204.231.221.109 | 255.255.255.255 | 127.0.0.1 | 127.0.0.1 |
| 11 | 204.231.221.255 | 255.255.255.255 | 204.231.221.109 | 204.231.221.10 |
| 12 | 224.0.0.0 | 224.0.0.0 | 192.168.0.6 | 192.168.0.6 |
| 13 | 255.255.255.255 | 255.255.255.255 | 192.168.0.6 | 192.168.0.6 |
| 14 | Default Gateway: | 204.231.221.109 | | |

In particular, the routes indicated by lines 9, 10, and 11 of Table 5 have been added from the preset routing file.

Figure 7:
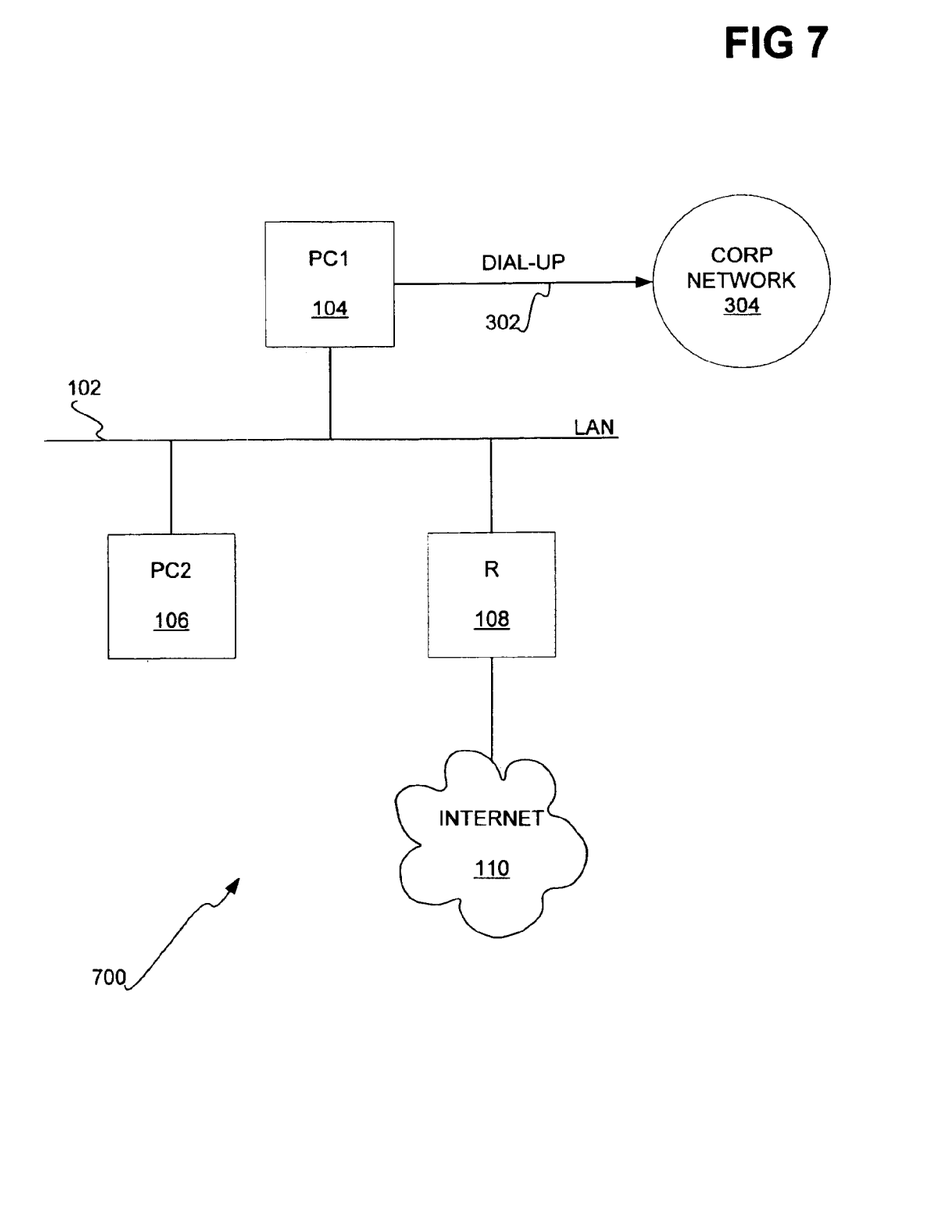
FIG. 7 is a diagram showing the environment of FIG. 3 in which accessibility to the Internet connection is restored, while accessibility to the corporate network is still maintained.
Figure 8:
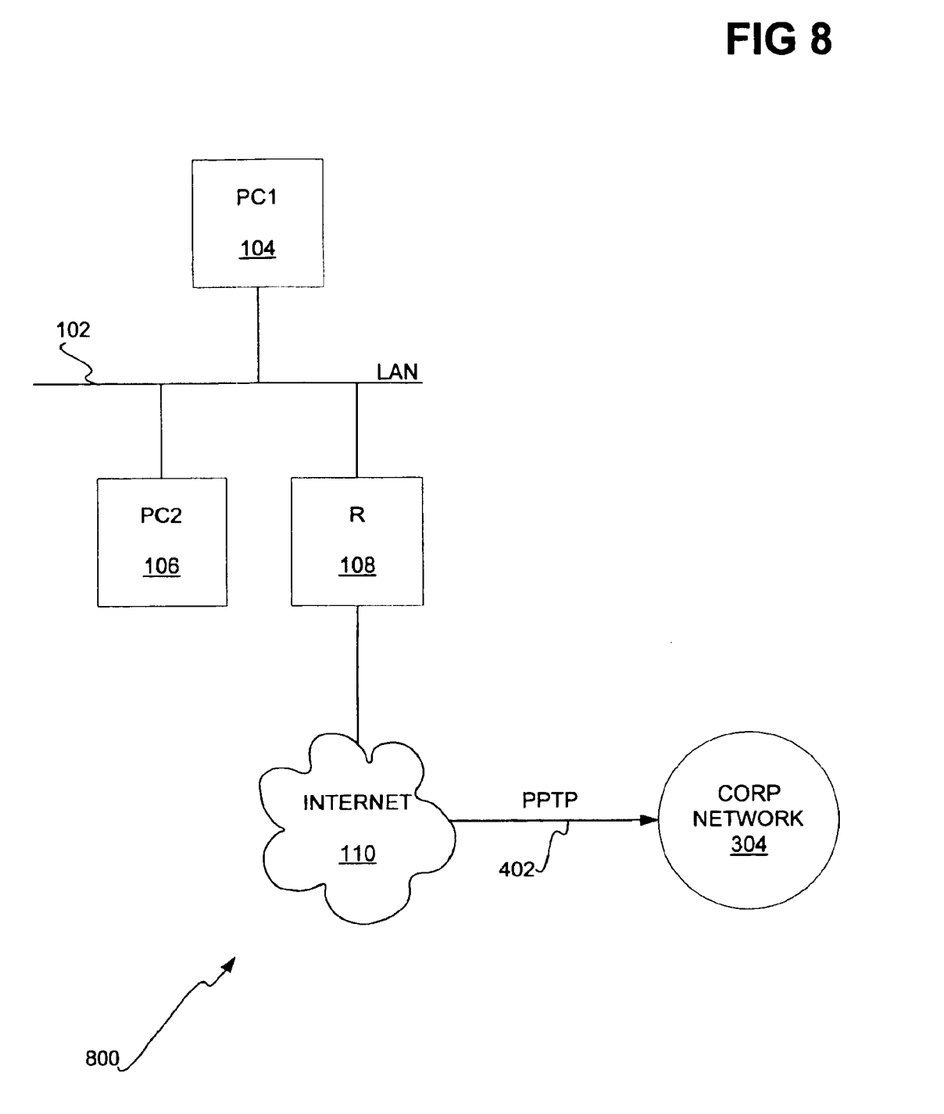
FIG. 8 is a diagram showing the environment of FIG. 4 in which accessibility to the Internet connection is stored, while accessibility to the corporate network is still maintained.

Because the second networking connection is now accessible by the routing table of Tab without the need for the new default gateway specified by line 4, the route of line 4 can safe removed (516). Removal causes the default route associated with the old default gateway to priority within the routing table, since it is again the only default route within the routing ta routing table of Table 6 shows the routing table of Table 5 after the new default gateway ha removed.

networking topologies of FIGS. 3 and 4 are transformed into the topologies of FIGS. 7 and 8, respectively. In particular, in the diagram 700 of FIG. 7, there no longer is a line between the router 108 and the Internet 110, as there is in FIG. 3, which indicates that the Internet 110 is concurrently accessible with the corporate network 304. Similarly, in the diagram 800 of FIG. 8, the Internet 110 is no longer defined by dotted lines, as it is in FIG. 4, indicating that destinations on the Internet 110 are accessible concurrently with destinations on the corporate network 304.

TABLE 6

| Line | Active Routes: Network Destination | Netmask | Gateway | Interface |
|---|---|---|---|---|
| 1 | | | | |
| 2 | | | | |
| 3 | 0.0.0.0 | 0.0.0.0 | 192.168.0.168 | 192.168.0.6 |
| 4 | 127.0.0.0 | 255.0.0.0 | 127.0.0.1 | 127.0.0.1 |
| 5 | 192.168.0.0 | 255.255.255.0 | 192.168.0.6 | 192.168.0.6 |
| 6 | 192.168.0.6 | 255.255.255.255 | 127.0.0.1 | 127.0.0.1 |
| 7 | 192.168.0.255 | 255.255.255.255 | 192.168.0.6 | 192.168.0.6 |
| 8 | 204.231.221.76 | 255.255.255.255 | 204.231.221.109 | 204.231.221.109 |
| 9 | 204.231.221.109 | 255.255.255.255 | 127.0.0.1 | 127.0.0.1 |
| 10 | 204.231.221.255 | 255.255.255.255 | 204.231.221.109 | 204.231.221.109 |
| 11 | 224.0.0.0 | 224.0.0.0 | 192.168.0.6 | 192.168.0.6 |
| 12 | 255.255.255.255 | 255.255.255.255 | 192.168.0.6 | 192.168.0.6 |
| 13 | Default Gateway: | 192.168.0.168 | | |

The metric of the route for the old default gateway of line 3 of Table 6 has decreased back to one with the removal of the route for the new default gateway of line 4 of Table 5.

Figure 6:
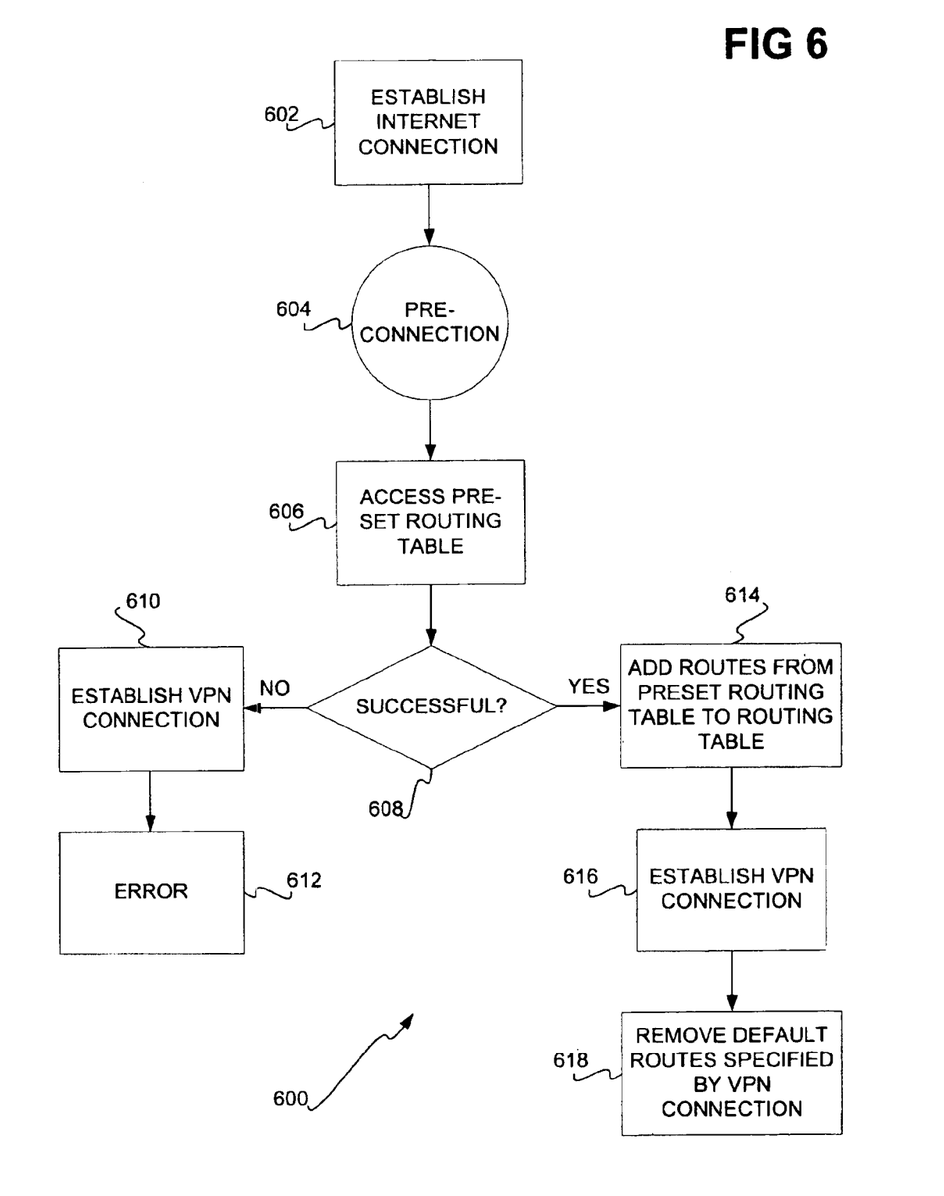
FIG. 6 is a flowchart of a method showing how another embodiment achieves concurrent access to both a first networking connection and a second networking connection.

The method 600 of FIG. 6 achieves concurrent access to both the first and the second networking connections by adding specific routes associated with the second networking connection before the second networking connection is made. A first connection, such as an Internet connection, is initially established (602). This can result in the network topology of FIG. 1, previously described. After the first connection is made, the local routing table has a default gateway, such as the address associated with the router 108. An example of a routing table after the first connection has been made is that of Table 3, which has already been described. Line 3 of Table 3 specifies a default route that is associated with the default gateway. It has priority within the routing table of Table 3 in that if no other route in the routing table is applicable to a given data packet, then the default route governs routing of the data packet.

Prior to the establishing of the second network connection, which causes a connection event, one or more pre-connection event actions (604) occur. In particular, a preset routing file that has one or more routes associated with the second networking connection that has yet to be made is accessed (606). The preset routing file, as before, is different than the routing table of the client. In the case of the method 600, it is typically stored locally as a file at the client performing the method 600. For example, the network administrator may have distributed the file electronically or on a floppy disk or CD-ROM for the end users to install on their individual clients. The file may also have been part of a connection management computer program that when run on the client causes the file to be stored locally at the client.

Accessing the preset routing file may be successful or unsuccessful (608). Failure may result, again, from the preset routing file not being found at the client. If unsuccessful, then the second connection is established (610), and an error is reported (612). The second connection may be a VPN connection, and can result in the network topology of FIG. 3, in the case of a dial-up connection, or FIG. 4, in the case of a tunneling connection. After the second connection has been made, the local routing table has a new default gateway. The old default gateway is no longer active, such that accessibility to nodes only accessible through the old default gateway is no longer possible. Thus, Internet connectivity resulting from the first connection is effectively lost. An example of a routing table after the second connection has been made in 610, where the preset routing file was not successfully accessed, is that of Table 4, which has already been described. Line 4 of Table 4 specifies a default route associated with the new default gateway, which has priority over the default route associated with the old default gateway, which is indicated by line 3 of Table 4.

However, if the preset routing file is successfully accessed, then routes from the preset that are associated with the default gateway of the second connection that has yet to be ma added to the local routing table (614). These routes do not specify default gateway routes, b are specific routes meant to route traffic intended for the second networking connection wit for a default gateway. The routing table of Table 7 shows the routing table of Table 3 after specified routes associated with the second networking connection have been added, but be second networking connection has actually been established.

TABLE 7

| Line | Active Routes: Network Destination | Netmask | Gateway | Interface |
|---|---|---|---|---|
| 1 | | | | |
| 2 | | | | |
| 3 | 0.0.0.0 | 0.0.0.0 | 192.168.0.e 7168 | 192.168.0.6 |
| 4 | 127.0.0.0 | 255.0.0.0 | 127.0.0.1 | 127.0.0.1 |
| 5 | 192.168.0.0 | 255.255.255.0 | 192.168.0.6 | 192.168.0.6 |
| 6 | 192.168.0.6 | 255.255.255.255 | 127.0.0.1 | 127.0.0.1 |
| 7 | 192.168.0.255 | 255.255.255.255 | 192.168.0.6 | 192.168.0.6 |
| 8 | 204.231.221.76 | 255.255.255.255 | 204.231.221.109 | 204.231.221.10 |
| 9 | 204.231.221.109 | 255.255.255.255 | 127.0.0.1 | 127.0.0.1 |
| 10 | 204.231.221.255 | 255.255.255.255 | 204.231.221.109 | 204.231.221.10 |
| 11 | 224.0.0.0 | 224.0.0.0 | 192.168.0.6 | 192.168.0.6 |
| 12 | 255.255.255.255 | 255.255.255.255 | 192.168.0.6 | 192.168.0.6 |
| 13 | Default Gateway: | 192.168.0.168 | | |

In particular, the routes indicated by lines 8, 9, and 10 of Table 7 have been added from the preset routing file.

Once the second networking connection, such as a VPN connection, is established (616), the routing table of Table 7 changes. An example of a routing table after the second connection has been made in this case is that of Table 5, which has already been described. Line 4 of Table 5 specifies a default route that is associated with the new default gateway. It has priority within the routing table of Table 5 over the default route associated with the old default gateway, which is indicated by line 3 of Table 5. That is, the metric of the new default route is lower than the metric of the old default route. Furthermore, the establishment of the second connection can result in the network topology of FIG. 3, in the case of a dial-up connection, or FIG. 4, in the case of a tunneling connection.

Once the second connection has been made (616), and because the routes from the preset routing file associated with the second connection have already been added to the local routing table (614), the route of line 4 of Table 5 can be safely removed (618). Removal causes the default route associated with the old default gateway to regain priority within the routing table, since it is again the only default route within the routing table. The routing table of Table 6, which has already been described, shows the routing table of Table 5 after the new default gateway has been removed. The metric of the route for the old default gateway of line 3 of Table 6 has decreased back to one with the removal of the route for the new default gateway of line 4 of Table 5.

The effect of the addition of the routes from the preset routing file in 614, and the removal of the default routes associated with the new default gateway in 618, is that both the first networking connection and the second networking connection are concurrently accessible through the routing table. For example, data packets intended for delivery over the Internet are again routed according to the route associated with the old default gateway of line 3 of Table 6. Data packets intended for delivery to the corporate network are still routed correctly due to the addition of the routes associated with the second networking connection of lines 8–10 of Table 6 from the preset routing file. The networking topologies of FIGS. 3 and 4 are transformed into the topologies of FIGS. 7 and 8, respectively, as have been described.

Example Computerized Device

Figure 9:
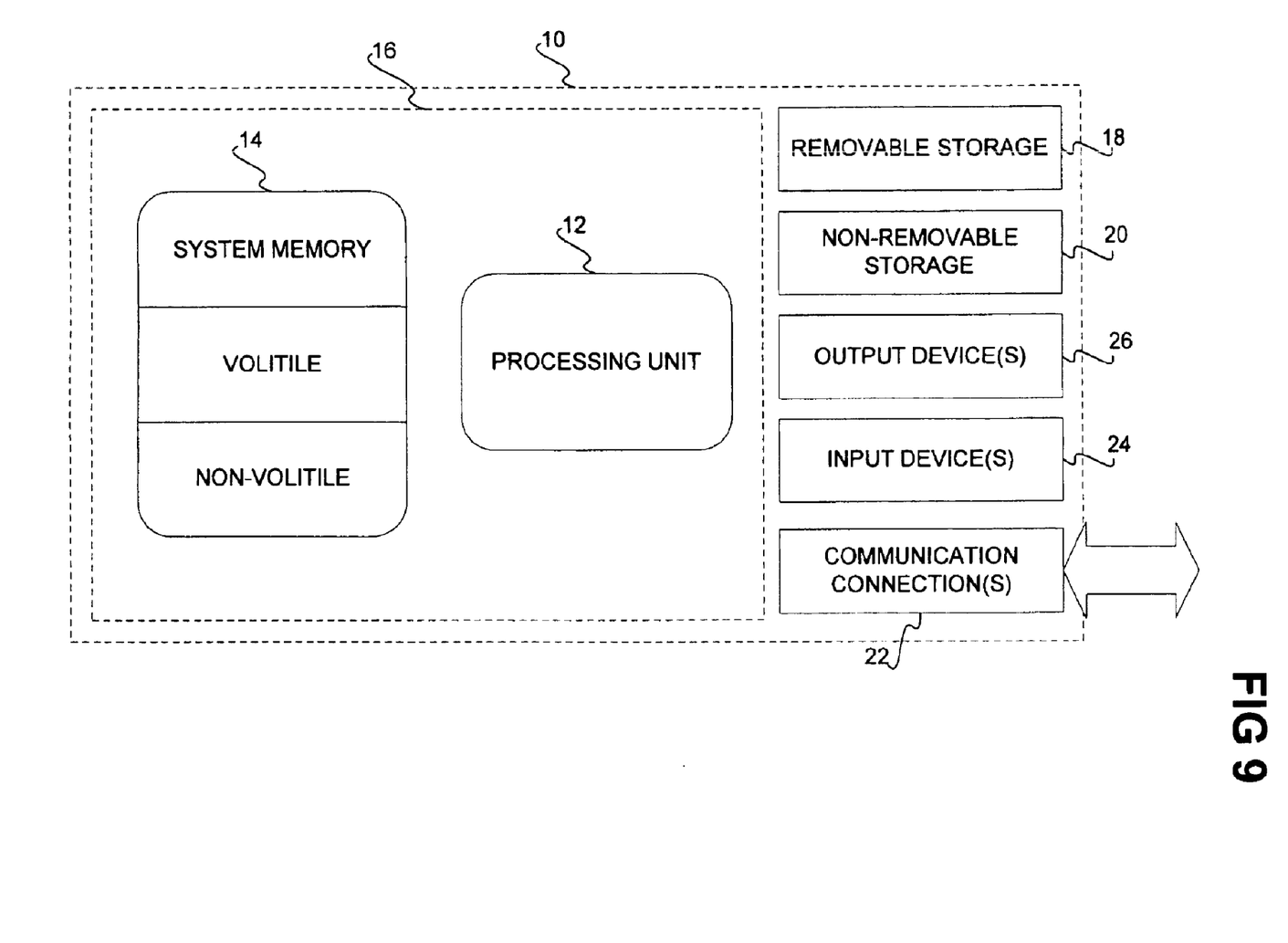
FIG. 9 is a diagram of an example computing device in conjunction with which the invention may be implemented.

FIG. 9 illustrates an example of a suitable computing system environment 10 on which the invention may be implemented. For example, the environment 10 can be the first client 104 and/or the second client 106 that have been described. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10. In particular, the environment 10 is an example of a computerized device that can implement the servers, clients, or other nodes that have been described.

The invention is operational with numerous other general purpose or special purpose computing system environments or configurations. Examples of well known computing systems, environments, and/or configurations that may be suitable for use with the invention include, but are not limited to, personal computers, server computers, handor laptop devices, multiprocessor systems, microprocessorsystems. Additional examples include set top boxes, programmable consumer electronics, network PCs, minicomputers, mainframe computers, distributed computing environments that include any of the above systems or devices, and the like.

The invention may be described in the general context of computer instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An exemplary system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20.

Computer storage media includes volatile, nonvolatile, removable, and non-removable media implemented in any method or technology for storage of information such as computer readable instructions, data structures, program modules, or other data. Memory 14, removable storage 18, and non-removable storage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 24 such as keyboard, mouse, pen, voice input device, touch input device, etc. Output device(s) 26 such as a display, speakers, printer, etc. may also be included. All these devices are well know in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A method for achieving concurrent access to both a first networking connection and a second networking connection comprising:

establishing the first networking connection, and causing one or more first default routes to be added to a routing table, the one or more first default routes associated with the first networking connection and having priority within the routing table;

establishing the second networking connection; and, accessing a preset routing file having one or more routes associated with the second networking connection, and adding the one or more routes associated with the second networking connection from the preset routing file to the routing table, wherein establishing the second networking connection causes one or more second default routes to be added to the routing table, the one or more second default routes associated with the second networking connection and having priority within the routing table over the first default routes.

2. The method of claim 1, further comprising removing the one or more second default routes from the routing table, and causing the one or more first default routes to regain priority within the routing table, such that the second networking connection is accessible through the one or more routes added to the routing table from the preset routing file, and the first networking connection is accessible through the one or more first default routes having regained priority within the routing table.

3. The method of claim 2, wherein each of the one or more first default routes has a metric of one when added to the routing table, such that the metric of each of the one or more first default routes is increased by one when the one or more second default routes are added to the routing table and is decreased by one when the one or more second default routes are removed from the routing table.

4. A computer-readable medium having a computer program stored thereon for execution by a processor to perform a method for achieving concurrent access to both a first networking connection and a second networking connection comprising:

establishing the first networking connection, and causing one or more first default routes to be added to a routing table, the one or more first default routes associated with the first networking connection and having priority within the routing table;

establishing the second networking connection, and causing one or more second default routes to be added to the routing table, the one or more second default routes associated with the second networking connection and having priority within the routing table over the first default routes;

accessing a preset routing file having one or more routes associated with the second networking connection, and adding the one or more routes associated with the second networking connection from the preset routing file to the routing table; and, removing the one or more second default routes from the routing table, and causing the one or more first default routes to regain priority within the routing table, such that the second networking connection is accessible through the one or more routes added to the routing table from the preset routing file, and the first networking connection is accessible through the one or more first default routes having regained priority within the routing table.

5. The medium of claim 4, wherein the first networking connection is an insecure networking connection.

6. The medium of claim 4, wherein the first networking connection is an Internet connection.

7. The medium of claim 4, wherein the first networking connection is one of a persistent and a dial-up networking connection.

8. The medium of claim 4, wherein the second networking connection is a secure networking connection.

9. The medium of claim 4, wherein the second networking connection is a virtual private networking (VPN) connection.

10. The medium of claim 4, wherein the second networking connection is one of a tunneling and a dial-up networking connection.

11. The medium of claim 4, wherein each of the one or more first default routes has a metric of one when added to the routing table, such that the metric of each of the one or more first default routes is increased by one when the one or more second default routes are added to the routing table and is decreased by one when the one or more second default routes are removed from the routing table.

12. The medium of claim 4, wherein each of the one or more second default routes has a metric of one when added to the routing table, such that each of the one or more second default routes is removed from the routing table by decrementing the metric by one, to zero.

13. The medium of claim 4, wherein the preset routing file is stored locally at a client performing the method.

14. The medium of claim 4, wherein the preset routing file is stored remotely at a server accessible through the second networking connection.

15. The medium of claim 4, wherein accessing the preset routing file causes one of a table access success and a table access failure, such that causing the table access failure results in aborting the method without adding the one or more routes associated with the second networking connection and without removing the one or more second default routes from the routing table, such that only the second networking connection, and not the first networking connection, is accessible.

16. The medium of claim 4, wherein establishing the second networking connection also results in a connection event, such that accessing the preset routing file, adding the one or more routes associated with the second networking connection, and removing the one or more second default routes from the routing table are post-connection event actions.

* * * * *